US009873311B1

(12) United States Patent
Bonati

(10) Patent No.: US 9,873,311 B1
(45) Date of Patent: Jan. 23, 2018

(54) VEHICULAR SUN SHADE

(71) Applicant: Alfred Bonati, Hudson, FL (US)

(72) Inventor: Alfred Bonati, Hudson, FL (US)

( * ) Notice: Subject to any disclaimer, the term of this patent is extended or adjusted under 35 U.S.C. 154(b) by 0 days.

(21) Appl. No.: 15/208,172

(22) Filed: Jul. 12, 2016

(51) Int. Cl.
*B60J 3/00* (2006.01)
*B60J 1/20* (2006.01)
*B60R 11/00* (2006.01)

(52) U.S. Cl.
CPC .............. *B60J 1/2011* (2013.01); *B60R 11/00* (2013.01); *B60R 2011/0026* (2013.01); *B60R 2011/0056* (2013.01)

(58) Field of Classification Search
CPC ........ B60J 3/0208; B60J 1/2091; B60J 11/00; B60J 1/2077; B60J 1/2011; B60R 11/04; B60R 1/1207; B60R 2001/1215; B60R 2001/1223; G02B 1/043
USPC ....... 296/97.7, 97.1, 97.11, 97.2, 97.6, 97.9; 160/370, 370.23, 370.22
See application file for complete search history.

(56) References Cited

U.S. PATENT DOCUMENTS

| | | | |
|---|---|---|---|
| 1,097,295 A | 5/1914 | Brown | |
| 1,158,005 A | 10/1915 | Richards, Jr. | |
| 1,228,545 A | 6/1917 | Fitzgerald | |
| 1,953,877 A * | 4/1934 | Chase | B60J 3/02 248/205.5 |
| 4,773,696 A * | 9/1988 | Steele | B60J 3/02 296/97.7 |
| 4,842,322 A | 6/1989 | Iu | |
| 5,247,391 A | 9/1993 | Gormley | |
| 5,263,760 A * | 11/1993 | Sohol | B60J 3/02 248/205.9 |
| D355,631 S * | 2/1995 | Lederhos | D12/191 |
| 5,494,328 A * | 2/1996 | Lehr | B60J 3/02 296/97.6 |
| D371,711 S | 7/1996 | Clark | |
| D426,801 S | 6/2000 | Abernathy | |
| 6,405,983 B1 * | 6/2002 | Goj | A47G 1/17 248/205.1 |
| 6,981,733 B1 * | 1/2006 | Driscoll | B60J 3/02 296/97.6 |
| 7,114,759 B1 * | 10/2006 | Chen | B60J 1/2091 296/97.2 |
| 7,232,176 B1 * | 6/2007 | Dopwell | B60J 3/0204 160/23.1 |
| 7,322,632 B1 * | 1/2008 | Marszalek | B60J 3/02 296/97.7 |
| 7,438,774 B2 * | 10/2008 | Kurfiss | B60R 11/04 156/64 |

(Continued)

*Primary Examiner* — Kiran B Patel
(74) *Attorney, Agent, or Firm* — Kyle A. Fletcher, Esq.

(57) ABSTRACT

The vehicular sun shade is adapted for use with a windshield of a vehicle. The vehicular sun shade is adapted for use on the windshield of the vehicle during operation of the vehicle. The vehicular sun shade is mounted on the windshield of a vehicle. The vehicular sun shade is a tinted lens. The vehicular sun shade is mounted on the windshield of the vehicle such that the vehicular sun shade reduces the light from a point source that is directed towards a target point within the vehicle. Examples of such a point source include, but are not limited to, the sun. Examples of such a target point include, but are not limited to, the eyes of a driver. The vehicular sun shade comprises a tinted lens, an attachment apparatus, and a handle. The attachment apparatus and the handle are attached to the tinted lens.

20 Claims, 3 Drawing Sheets

(56) References Cited

U.S. PATENT DOCUMENTS

| | | | | |
|---|---|---|---|---|
| 7,493,933 B2* | 2/2009 | Li | ................ | B60J 1/2019 |
| | | | | 160/310 |
| 7,618,079 B2* | 11/2009 | Rawat | ................ | B60J 3/0208 |
| | | | | 296/97.1 |
| 8,287,025 B1* | 10/2012 | Bandola | ................ | B60J 3/0247 |
| | | | | 296/97.1 |
| 8,342,226 B2* | 1/2013 | Zheng | ................ | E06B 9/24 |
| | | | | 160/370.21 |
| 2002/0135197 A1* | 9/2002 | Howard | ................ | B60J 3/0204 |
| | | | | 296/97.7 |
| 2002/0171256 A1* | 11/2002 | Ward | ................ | B60P 3/34 |
| | | | | 296/26.01 |
| 2005/0073168 A1* | 4/2005 | Herrera | ................ | B60J 3/0204 |
| | | | | 296/97.1 |
| 2012/0313396 A1* | 12/2012 | Chino | ................ | B60J 3/0208 |
| | | | | 296/97.2 |
| 2013/0032299 A1* | 2/2013 | Bratcher | ................ | B60J 1/2091 |
| | | | | 160/84.01 |

\* cited by examiner

VEHICULAR SUN SHADE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and windshields and windscreens for vehicles, more specifically, an accessory that reduces light intensity passing through a windshield.

SUMMARY OF INVENTION

The vehicular sun shade is adapted for use with a windshield of a vehicle. The vehicular sun shade is adapted for use on the windshield of the vehicle during operation of the vehicle. The vehicular sun shade is mounted on the windshield of a vehicle. The vehicular sun shade is a tinted lens. The vehicular sun shade is mounted on the windshield of the vehicle such that the vehicular sun shade reduces the light from a point source that is directed towards a target point within the vehicle. Examples of such a point source include, but are not limited to, the sun. Examples of such a target point include, but are not limited to, the eyes of a driver. The vehicular sun shade comprises a tinted lens, an attachment apparatus, and a handle. The attachment apparatus and the handle are attached to the tinted lens.

These together with additional objects, features and advantages of the vehicular sun shade will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular sun shade in detail, it is to be understood that the vehicular sun shade is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular sun shade.

It is therefore important that the claims be regarded as including such equivalent construction insofar as they do not depart from the spirit and scope of the vehicular sun shade. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
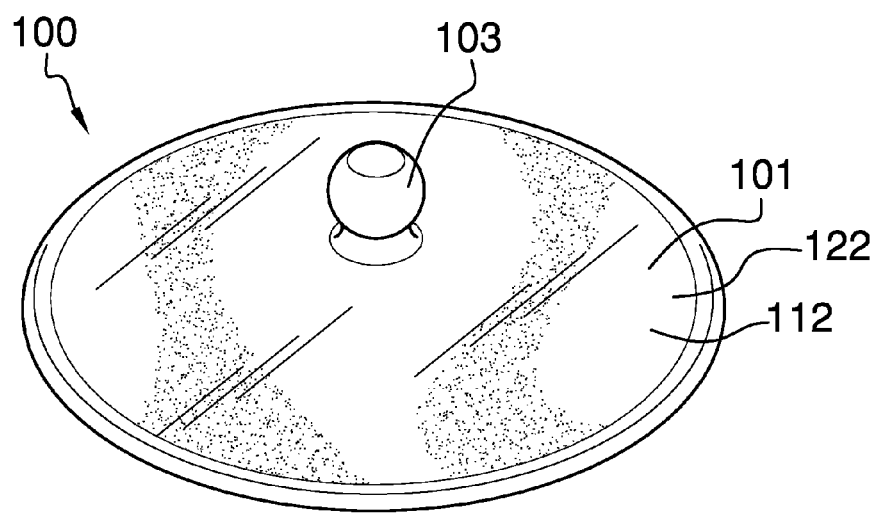
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The vehicular sun shade 100 (hereinafter invention) comprises a tinted lens 101, an attachment apparatus 102, and a handle 103. The invention 100 is adapted for use with a windshield 133 of a vehicle 132. The invention 100 is adapted for use on the windshield 133 of the vehicle 132 during operation of the vehicle 132. The invention 100 is mounted on the windshield 133 of a vehicle 132. The invention 100 is a tinted lens 101. The invention 100 is mounted on the windshield 133 of the vehicle 132 such that the invention 100 reduces the light from a point source that is directed towards a target point within the vehicle 132. Examples of such a point source include, but are not limited to, the sun 131. Examples of such a target point include, but are not limited to, the eyes of a driver. The attachment apparatus 102 and the handle 103 are attached to the tinted lens 101.

The tinted lens 101 is a transparent object that is further defined with a first surface 111 and a second surface 112. The tinted lens 101 is not configured to concentrate or disperse light but is designed to allow light to pass through the tinted lens 101 without changing the direction of the vector of the light. The tinted lens 101 is a tinted structure that that reduces the total amount of light that passes through the tinted lens 101. The purpose of the tinted lens 101 is to reduce the total amount of light that passes from a point source through the tinted lens 101 to a previously specified point target. One anticipated use of the tinted lens 101 is to reduce the amount of sun 131 light that falls into the eyes of a driver of the vehicle 132 when the vehicle 132 is driven directly into the sun 131. Readily and commercially available products to tint transparent objects include, but not limited to, tint films. These products are well known and documented to those skilled in the automotive arts.

The tinted lens 101 is formed from a transparent elastomeric material. The elastomeric material is used to adjust the tinted lens 101 to the surface contour of the windshield 133 of the vehicle 132. In some potential embodiment of the disclosure, the use of elastomeric material is further required by the attachment apparatus 102

The attachment apparatus 102 is an apparatus that attaches the first surface 111 of the tinted lens 101 to the windshield 133 of the vehicle 132.

Figure 2:
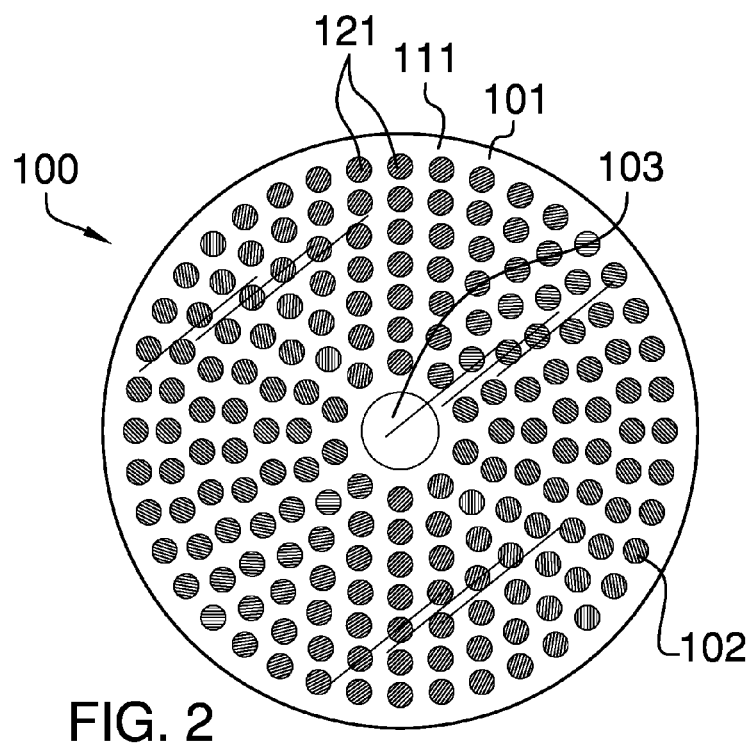
FIG. 2 is a front view of an embodiment of the disclosure.
Figure 3:
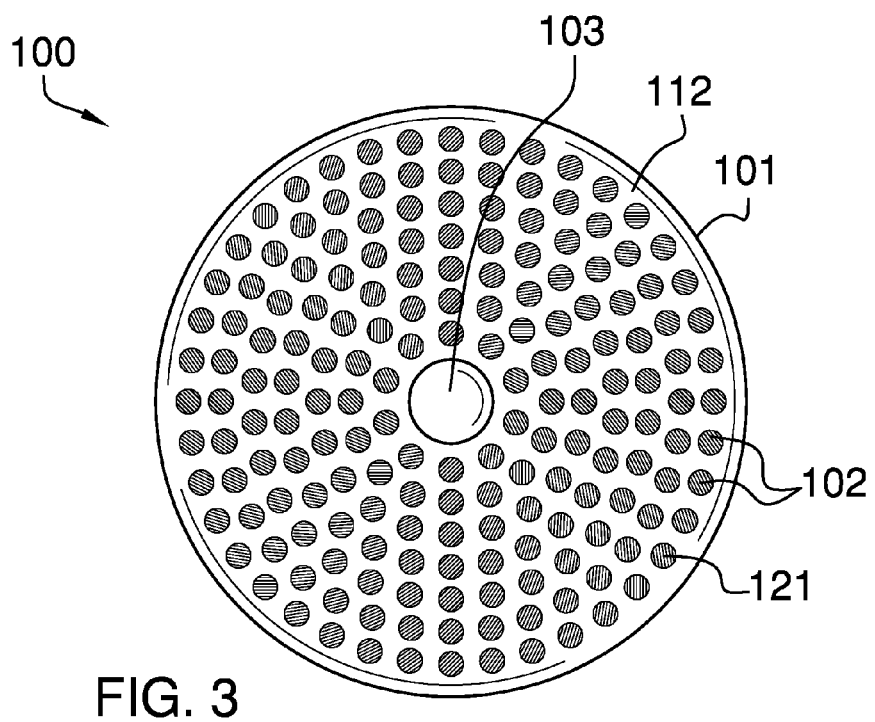
FIG. 3 is a rear view of an embodiment of the disclosure.

In the first potential embodiment of the disclosure, as shown most clearly in FIGS. 2 and 3, the attachment apparatus 102 is a pressure sensitive adhesive 121 that is applied to the first surface 111 of the tinted lens 101. When the first surface 111 of the tinted lens 101 is pressed against the windshield 133 of the vehicle 132 the pressure sensitive adhesive 121 will adhere the tinted lens 101 to the windshield 133. The pressure sensitive adhesive used in the first potential embodiment of the disclosure is a transparent material.

The first potential embodiment of the disclosure is preferred for a single use, or disposable, application of the invention 100.

Figure 4:
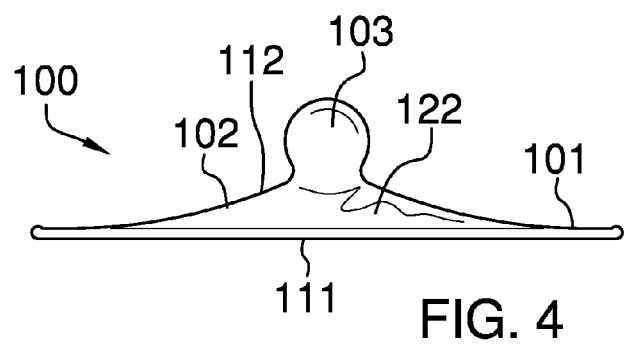
FIG. 4 is a side view of an embodiment of the disclosure.
Figure 5:
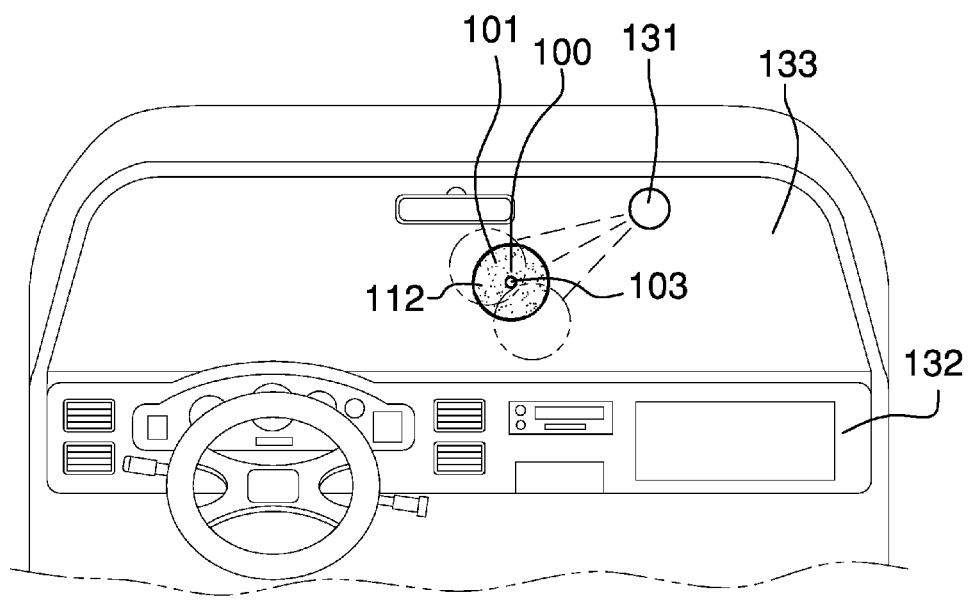
FIG. 5 is an in use view of an embodiment of the disclosure.

In the second potential embodiment of the disclosure, as shown most clearly in FIG. 4, the elastomeric material used to form the tinted lens 101 allows the tinted lens 101 to be formed in the characteristic shape of a suction cup 122. By designing the tinted lens 101 in the form of a suction cup 122, the tinted lens 101 can be adhered to the windshield 133 of the vehicle 132 through the creation of a negative air pressure between the first surface 111 of the tinted lens 101 and the windshield 133. The tinted lens 101 is attached to the windshield 133 by placing the first surface 111 against the windshield 133 and pressing the first surface 111 flat against the windshield 133. This evacuates air that was trapped in the space between the first surface 111 and the windshield 133 thereby creating the negative pressure required for a suction cup 122.

The second potential embodiment of the disclosure is preferred when it is anticipated that the invention 100 will be used multiple times.

As shown most clearly in FIGS. 1 and 3, the second surface 112 of the tinted lens 101 is formed with a handle 103. The handle 103 is a grip that allows the invention 100 to be conveniently carried and otherwise manipulated. In a third potential embodiment of the disclosure, the handle 103 is a knob.

To use the invention 100, the tinted lens 101 is positioned against the windshield 133 of the vehicle 132 such that light generated from a point source will pass through the tinted lens 101 before striking the designated target point within the vehicle 132. When the tinted lens 101 is so positioned, the tinted lens 101 is attached to the windshield 133 using the attachment apparatus 102. When no longer needed, the invention 100 is removed from the windshield.

In a fourth potential embodiment of the disclosure, the tinted lens 101 and handle 103 are formed from polycarbonate and are tinted using a commercially available film The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Elastic: As used in this disclosure, an elastic is a material or object that deforms when a force is applied to it and that is able to return to its original shape after the force is removed. A material that exhibits these qualities is also referred to as an elastomeric material.

Handle: As used in this disclosure, a handle is an object by which a tool, object, or door is held or manipulated with the hand.

Lens: As used in this disclosure, a lens is a transparent object through which light can pass. A lens may or may not be formed with curved surfaces that are used to concentrate or disperse the light that travels through he lens.

Pressure Sensitive Adhesives: As used in this disclosure, a pressure sensitive adhesive is an adhesive that is permanently tacky adhesive that is activated by the application of pressure.

Suction Cup: As used in this disclosure, a suction cup means an object or device that uses negative fluid pressure of air or water to adhere to nonporous surfaces by creating a) partial vacuum.

Tinted: As used in this this disclosure, a tinted object is an first object made of first transparent material that has been coated, treated, or processed with a second material that reduces the amount of light that passes through the transparent material of the first object while not significantly scattering the light that passes through the first transparent material such that object behind the first object would remain clearly visible.

Transparent: As used in this disclosure, transparent refers to a material that allows light to past through the material without significant scattering such that an object can be clearly seen through the material.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An accessory comprising:
   a tinted lens, an attachment apparatus, and a handle;
   wherein the apparatus is adapted for use with a windshield of a vehicle;
   wherein the apparatus is adapted for use during operation of the vehicle;
   wherein the apparatus is mounted on the windshield of a vehicle;
   wherein the apparatus reduces the light received from a point source that is directed towards a target point within the vehicle;
   wherein the attachment apparatus and the handle are attached to the tinted lens.

2. The accessory according to claim 1
   wherein the tinted lens is a transparent object;
   wherein the tinted lens is further defined with a first surface and a second surface;

wherein the tinted lens allows light to pass through the tinted lens without changing the direction of the vector of the light.

3. The accessory according to claim 2 wherein the tinted lens is a structure that reduces the amount of light that passes through the tinted lens relative to the amount of light striking the tinted lens.

4. The accessory according to claim 3 wherein the tinted lens is formed from a transparent elastomeric material.

5. The accessory according to claim 4 wherein the tinted lens adjusts to the surface contour of the windshield of the vehicle.

6. The accessory according to claim 5 wherein the attachment apparatus attaches the first surface of the tinted lens to the windshield of the vehicle.

7. The accessory according to claim 6 wherein the attachment apparatus is a pressure sensitive adhesive that is applied to the first surface of the tinted lens.

8. The accessory according to claim 7 wherein the pressure sensitive adhesive is transparent.

9. The accessory according to claim 8 wherein the attachment apparatus is removable from the windshield of the vehicle.

10. The accessory according to claim 9 wherein the second surface of the tinted lens is formed with a handle.

11. The accessory according to claim 10 wherein the handle is a knob.

12. The accessory according to claim 5 wherein the tinted lens is a suction cup.

13. The accessory according to claim 12 wherein the tinted lens is adhered to the windshield of the vehicle through the creation of a negative air pressure between the first surface of the tinted lens and the windshield.

14. The accessory according to claim 13 wherein the attachment apparatus is removable from the windshield of the vehicle.

15. The accessory according to claim 14 wherein the second surface of the tinted lens is formed with a handle.

16. The accessory according to claim 15 wherein the handle is a knob.

17. The accessory according to claim 1 wherein the tinted lens is a transparent object;
   wherein the tinted lens is further defined with a first surface and a second surface;
   wherein the tinted lens is a structure that reduces the amount of light that passes through the tinted lens relative to the amount of light striking the tinted lens;
   wherein the tinted lens is formed from an elastomeric material;
   wherein the attachment apparatus attaches the first surface of the tinted lens to the windshield of the vehicle;
   wherein the attachment apparatus is removable from the windshield of the vehicle.

18. The accessory according to claim 17 wherein the attachment apparatus is selected from the group consisting of an adhesive or a suction cup.

19. The accessory according to claim 18 wherein the tinted lens allows light to pass through the tinted lens without changing the direction of the vector of the light.

20. The accessory according to claim 19 wherein the second surface of the tinted lens is formed with a handle.

* * * * *